(12) United States Patent
Kitsuki et al.

(10) Patent No.: US 10,207,882 B2
(45) Date of Patent: Feb. 19, 2019

(54) MEDIUM FEEDING APPARATUS, IMAGE READING APPARATUS, AND RECORDING APPARATUS

(71) Applicant: SEIKO EPSON CORPORATION, Tokyo (JP)

(72) Inventors: Hiromichi Kitsuki, Kitakyushu (JP); Kiyotaka Nakamura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/841,015

(22) Filed: Dec. 13, 2017

(65) Prior Publication Data
US 2018/0170695 A1 Jun. 21, 2018

(30) Foreign Application Priority Data
Dec. 21, 2016 (JP) ................. 2016-247512

(51) Int. Cl.
| | |
|---|---|
| *H04N 1/04* | (2006.01) |
| *B65H 3/66* | (2006.01) |
| *H04N 1/00* | (2006.01) |
| *B65H 5/06* | (2006.01) |
| *B65H 1/02* | (2006.01) |

(52) U.S. Cl.
CPC ............ *B65H 3/66* (2013.01); *B65H 1/02* (2013.01); *B65H 5/062* (2013.01); *H04N 1/00588* (2013.01); *H04N 1/00615* (2013.01); *B65H 2801/39* (2013.01); *H04N 2201/0081* (2013.01)

(58) Field of Classification Search
CPC . B65H 3/66; B65H 1/02; B65H 5/062; B65H 2801/39; H04N 1/00588; H04N 1/00615; H04N 2201/0081

USPC .................................................. 358/498, 496
See application file for complete search history.

(56) References Cited

U.S. PATENT DOCUMENTS

| | | | | |
|---|---|---|---|---|
| 9,938,107 | B2* | 4/2018 | Nakamura | ............. B65H 29/12 |
| 2014/0063573 | A1* | 3/2014 | Yonemura | .......... H04N 1/00602 358/498 |
| 2018/0041651 | A1* | 2/2018 | Nakamura | ......... H04N 1/00588 |
| 2018/0045612 | A1* | 2/2018 | McGuire | ............... G01M 17/04 |
| 2018/0162676 | A1* | 6/2018 | Nakamura | ............. B65H 29/14 |

FOREIGN PATENT DOCUMENTS

| | | |
|---|---|---|
| JP | 2002-002967 | 1/2002 |
| JP | 2002-284362 | 10/2002 |
| JP | 2010-024002 | 2/2010 |

* cited by examiner

*Primary Examiner* — Cheukfan Lee
(74) *Attorney, Agent, or Firm* — Workman Nydegger

(57) ABSTRACT

A pair of edge guides provided on a medium mounting section of a medium feeding apparatus each include a volume limiter spaced from the mounting surface of the medium mounting section and extending from the guide surface of at least one of the pair of edge guides in a direction intersecting the guide surface, the volume limiter including a limiting surface that limits a number of sheets mounted on the medium mounting section. The limiting surface includes a groove extending in the feed direction, at a position between a corner portion formed at an intersection of an end portion of the limiting surface in the width direction and the guide surface, and the other end portion of the limiting surface, and configured to insert at least a part of a side edge of the medium, to thereby restrict the side edge from moving in the width direction.

20 Claims, 17 Drawing Sheets

MEDIUM FEEDING APPARATUS, IMAGE READING APPARATUS, AND RECORDING APPARATUS

BACKGROUND

1. Technical Field

The present invention relates to a medium feeding apparatus that feeds a medium, and an image reading apparatus and a recording apparatus that include the medium feeding apparatus.

2. Related Art

Some existing image reading apparatuses, for example a scanner, include a medium feeding apparatus, also called automatic document feeder (ADF), that automatically feed sheets (source documents) to enable automatic feeding and reading of a plurality of source documents.

Some recording apparatuses, such as a printer, also include a similar medium feeding apparatus that automatically feeds recording sheets.

Further, some of such medium feeding apparatuses include an edge guide provided on a medium tray on which the sheets are mounted, to guide the side edge of the sheet in the width direction, the edge guide being configured so as to slide in the width direction according to the size of the sheet.

In the medium feeding apparatus, the sheet may sometimes skew, in other words be obliquely inclined while being transported.

For example, JP-A-2002-284362 proposes providing a guide groove 61a of a comb-teeth shape on an inner surface of side limiter plates 61 and 61A (corresponding to the edge guide), to prevent the sheet from skewing.

In addition, JP-A-2010-24002 discloses a configuration in which respective inner surfaces (guide surfaces 1c and 1c) of a left guide portion 721 and a right guide portion 731 (corresponding to the edge guide) are biased so as to inwardly incline toward each other, to prevent the sheet from skewing.

In the configuration according to JP-A-2002-284362, however, the presence of the guide groove 61a of the comb-teeth shape formed on the inner surface of the side limiter plates 61 and 61A may constitute a resistance against the sheets being fed.

In particular, when a certain number of sheets are stacked on a paper feed tray (corresponding to the medium tray), the side edges of the sheet stack in the width direction and the inner surface of the side delimiting plates 61 and 61A make contact with each other via a larger contact area, and therefore the guide groove 61a is more prone to constitute a resistance against the sheets being fed. Such a resistance may disturb the sheet from being properly fed.

In the configuration according to JP-A-2010-24002 also, since the left guide portion 721 and the right guide portion 731 are biased by a coil spring 7a so as to inwardly incline toward each other, the biasing force of the coil spring 7a may constitute a resistance against the sheets being fed. In this case also, the biasing force is more prone to constitute a resistance against the sheets being fed, when a certain number of sheets are stacked on a hopper 71 (corresponding to the medium tray).

SUMMARY

An advantage of some aspects of the invention is provision of a medium feeding apparatus configured to properly feed a medium from a medium setting region, and an image reading apparatus and a recording apparatus that include such a medium feeding apparatus.

In an aspect, the invention provides a medium feeding apparatus, including a medium mounting section including a mounting surface configured to mount a plurality of sheets of media to be fed, a pair of edge guides provided on the medium mounting section and each including a guide surface that guides a side edge of the medium in a width direction intersecting a feed direction, and a volume limiter located with a spacing from the mounting surface and extending from the guide surface of at least one of the pair of edge guides in a direction intersecting the guide surface, the volume limiter including a limiting surface that limits a number of sheets of the medium mounted on the medium mounting section. The limiting surface includes a groove formed so as to extend in the feed direction, at a position between a corner portion formed at an intersection of an end portion of the limiting surface in the width direction and the guide surface, and the other end portion of the limiting surface, the groove being configured to restrict the side edge from moving in the width direction.

With the mentioned configuration, the groove formed in the limiting surface restricts the side edge of the medium from moving in the width direction. Therefore, the skew of the medium can be prevented.

The groove barely constitutes a resistance against the sheets being fed, even when a plurality of sheets are stacked on the medium mounting section, and therefore the medium mounted on the medium mounting section can be properly fed.

In the foregoing medium feeding apparatus, the groove may be formed at least at the corner portion.

Forming thus the groove at least at the corner portion effectively prevents the skew of the medium.

In the foregoing medium feeding apparatus, the limiting surface may include a first groove corresponding to the groove formed at the corner portion, and a second groove formed at a position spaced from the first groove in a direction toward the other end portion.

The mentioned configuration prevents the side edge of the medium from moving further, when the side edge of the medium has moved beyond the first groove formed at the corner portion toward the other end portion. Therefore, the skew of the medium can be more securely prevented.

In the foregoing medium feeding apparatus, the volume limiter may include a plurality of the grooves, such that a cross-section of the volume limiter in the width direction assumes a comb-teeth shape.

The mentioned configuration further assures the prevention of the skew of the medium.

In another aspect, the invention provides a medium feeding apparatus including a medium mounting section including a mounting surface configured to mount a plurality of sheets of media to be fed, a pair of edge guides provided on the medium mounting section and each including a guide surface that guides a side edge of the medium in a width direction intersecting a feed direction, and a movable portion provided on at least one of the pair of edge guides and formed so as to pivot such that a first surface of the movable portion protrudes from the guide surface. The movable portion has a pivotal fulcrum on a side closer to the medium mounting section, so that a free end of the movable portion pivots, owing to a self-weight thereof, in a direction in which the movable portion protrudes from the guide surface.

The mentioned medium feeding apparatus includes the movable portion provided on the edge guide and formed so as to pivot such that the first surface protrudes from the guide surface, and the movable portion has a pivotal fulcrum on the side closer to the medium mounting section, so that the free end of the movable portion pivots, owing to the self-weight, in the direction in which the movable portion protrudes from the guide surface. Therefore, the skew of the medium can be prevented, with reduced risk that a resistance is imposed against the side of the medium. Consequently, the medium mounted on the medium mounting section can be properly fed.

In the foregoing medium feeding apparatus, the first surface of the movable portion may protrude from the guide surface by a larger amount, with a decrease in number of sheets of the media.

The medium being fed is more likely to skew, when a fewer number of sheets are mounted on the medium mounting section.

With the mentioned configuration, however, since the movable portion protrudes from the guide surface by a larger amount, with a decrease in number of sheets of the medium, the skew of the medium can be effectively prevented, even when a fewer number of sheets are mounted.

In the foregoing medium feeding apparatus, the movable portion may include a conducting portion formed on an upstream side in the feed direction of the medium, to conduct the medium toward the first surface.

The mentioned configuration facilitates the medium to be inserted into a position on an inner side of the first surface, when the medium is to be mounted on the medium mounting section.

In the foregoing medium feeding apparatus, the movable portion may include a groove formed at least in a part of the first surface, so as to extend in the feed direction, to insert at least a part of the side edge of the medium to thereby restrict the side edge from moving in the width direction.

The mentioned configuration further assures the prevention of the skew of the medium.

In still another aspect, the invention provides an image reading apparatus including a reading unit that reads an image on the medium, and the medium feeding apparatus configured as above, to feed the medium to the image reading unit.

The mentioned configuration provides, with the medium feeding apparatus incorporated in the image reading apparatus to feed the medium toward the reading unit, the same advantageous effects as those provided by at least one of the foregoing configurations.

In still another aspect, the invention provides a recording apparatus including a recording unit that performs recording on the medium, and the medium feeding apparatus configured as above, to feed the medium to the recording unit.

The mentioned configuration provides, with the medium feeding apparatus incorporated in the recording apparatus to feed the medium toward the recording unit, the same advantageous effects as those provided by at least one of the foregoing configurations.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

First, the outline of an image reading apparatus according to a first embodiment of the invention will be described. In this embodiment, the image reading apparatus will be exemplified by a document scanner 1 (hereinafter, simply "scanner 1") capable of reading at least one of the front surface and the back surface of a medium.

Figure 1:
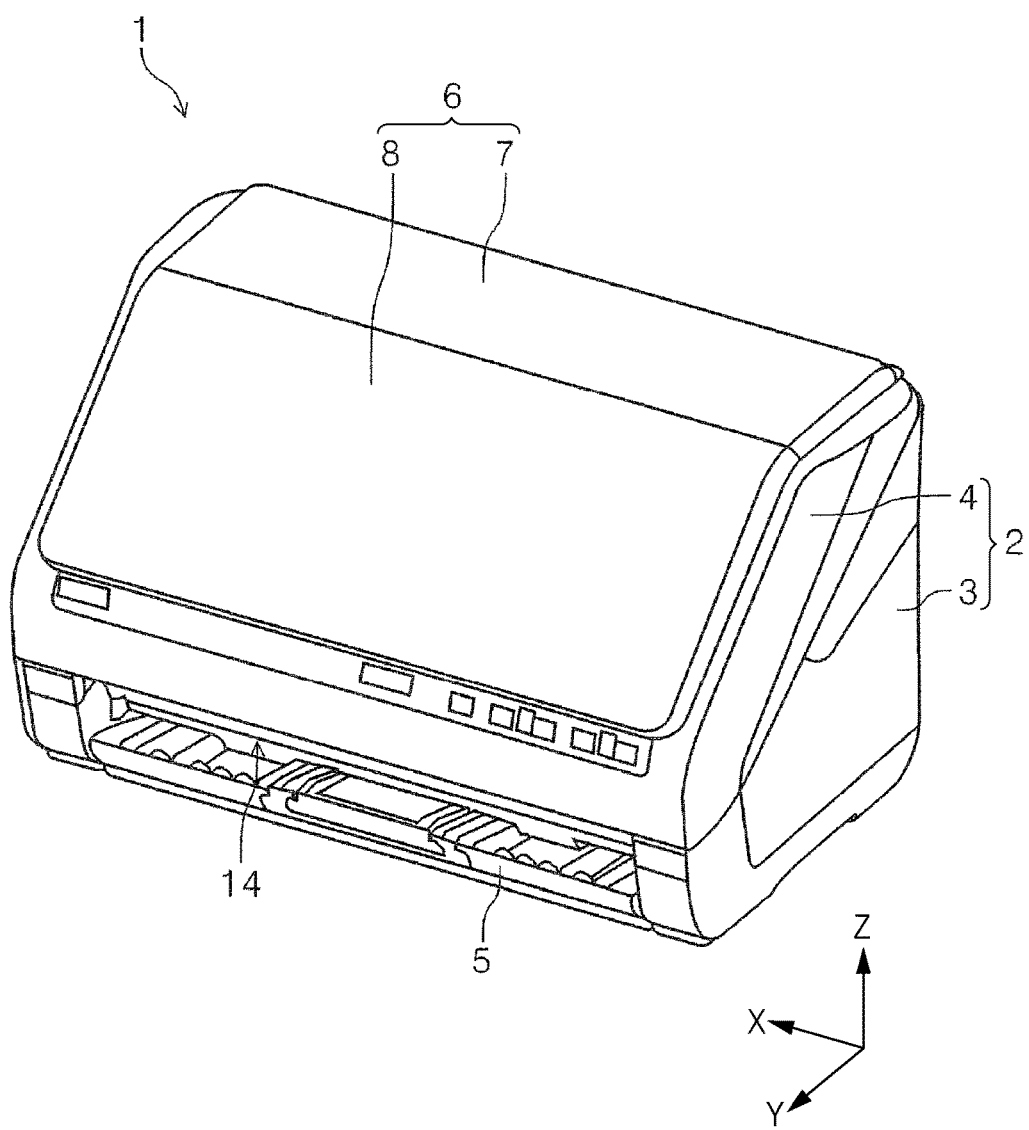
FIG. 1 is a perspective view showing an appearance of a scanner according to the invention.
Figure 2:
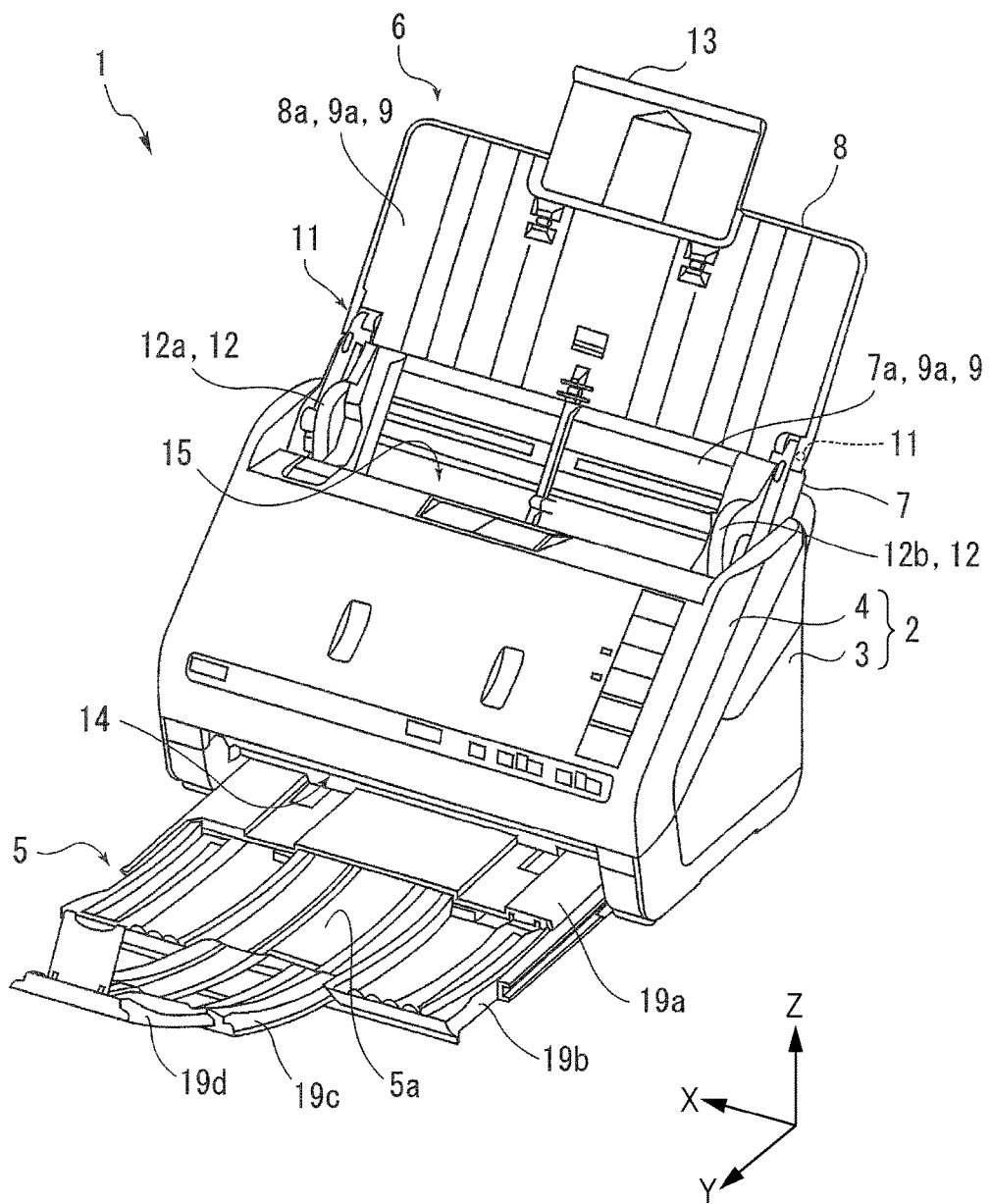
FIG. 2 is a perspective view showing the scanner according to the invention, with an upper cover unit opened and a discharge tray drawn out.
Figure 3:
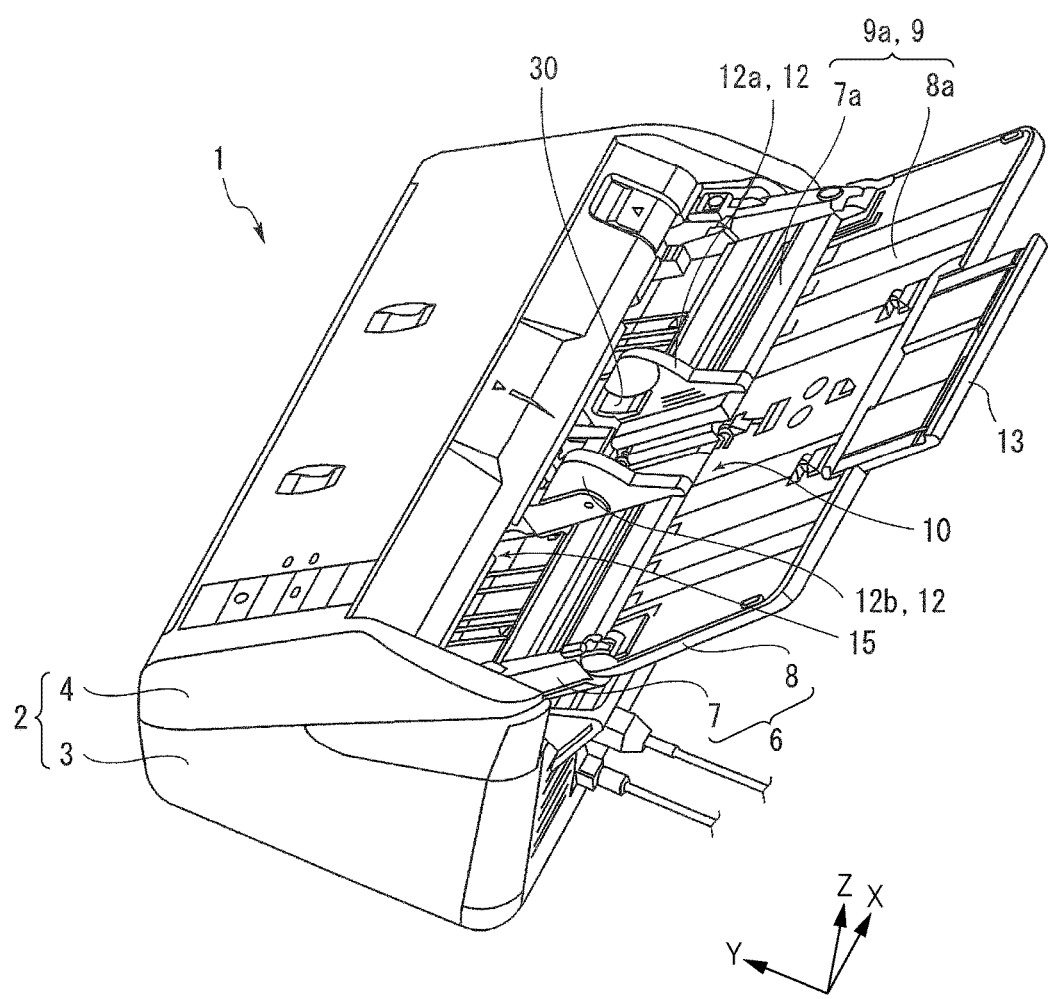
FIG. 3 is a perspective view showing the scanner according to the invention, with the upper cover unit opened.
Figure 4:
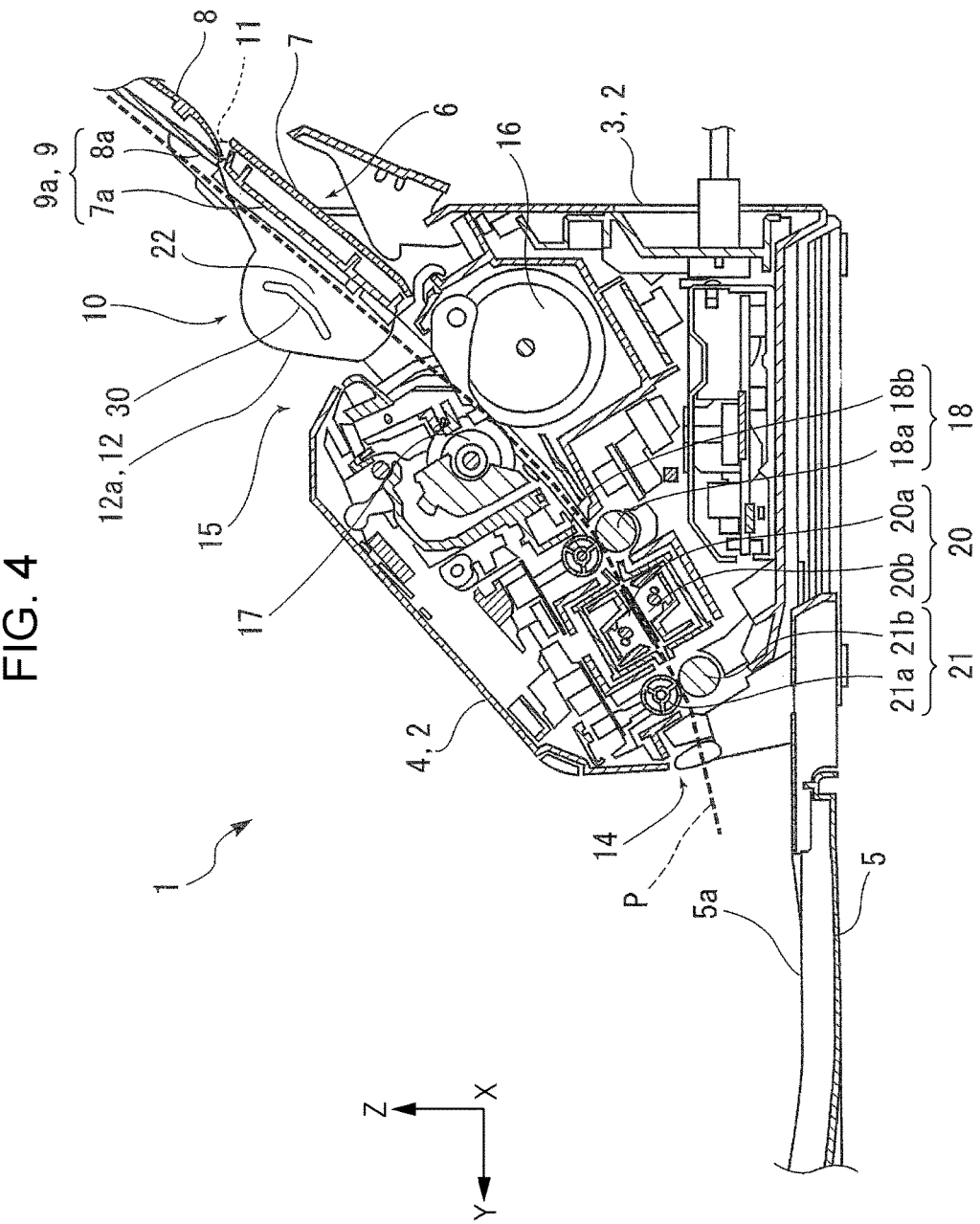
FIG. 4 is a side cross-sectional view of the scanner shown in FIG. 2, for explaining a sheet transport route.
Figure 5:
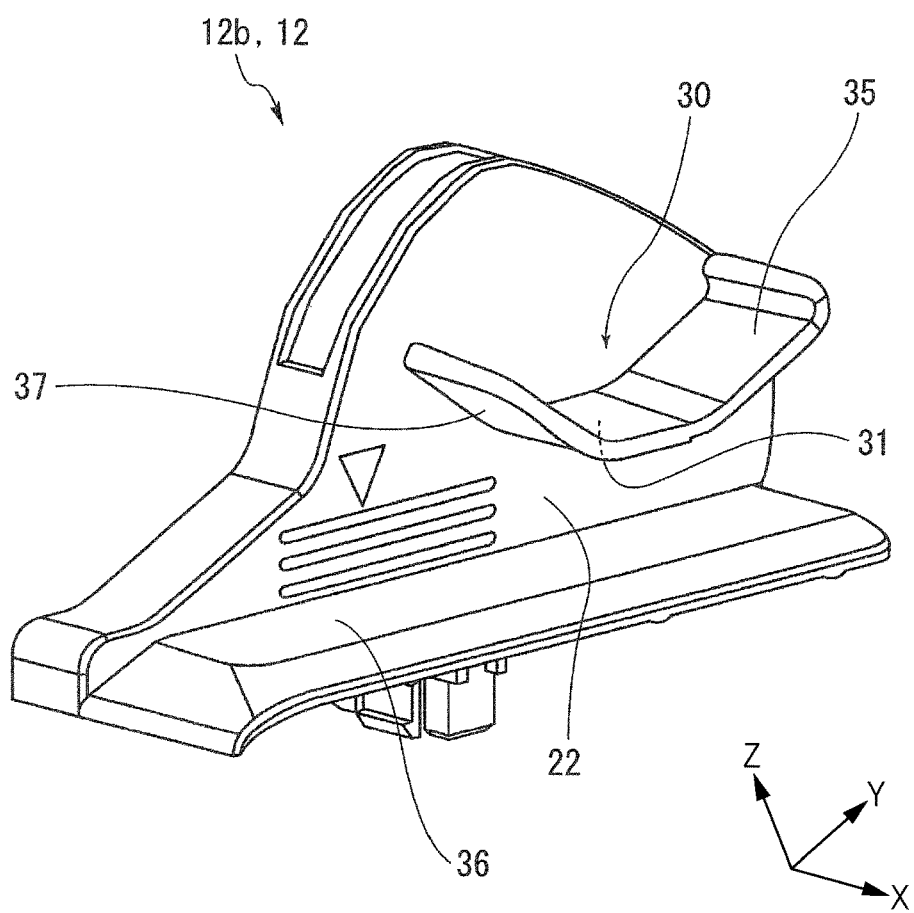
FIG. 5 is a perspective view showing an edge guide.
Figure 6:
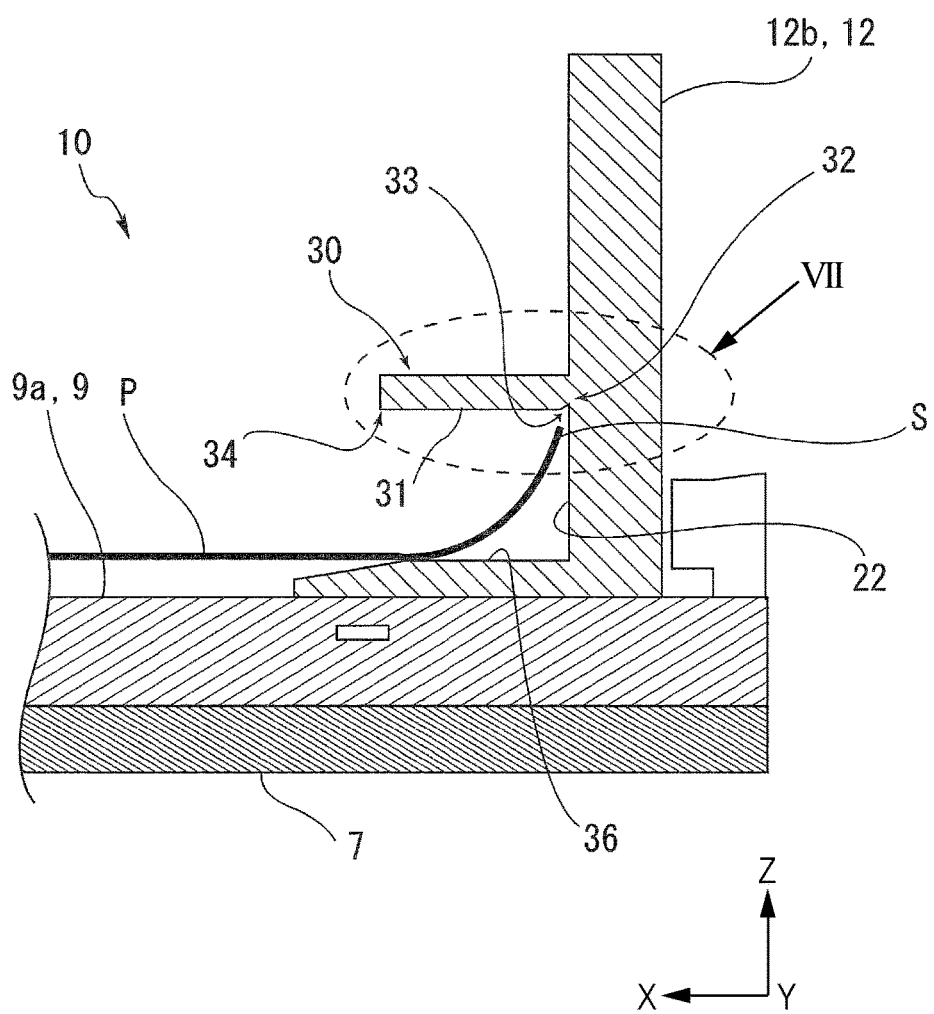
FIG. 6 is a cross-sectional view showing an essential part of a medium feeding apparatus according to a first embodiment.
Figure 7:
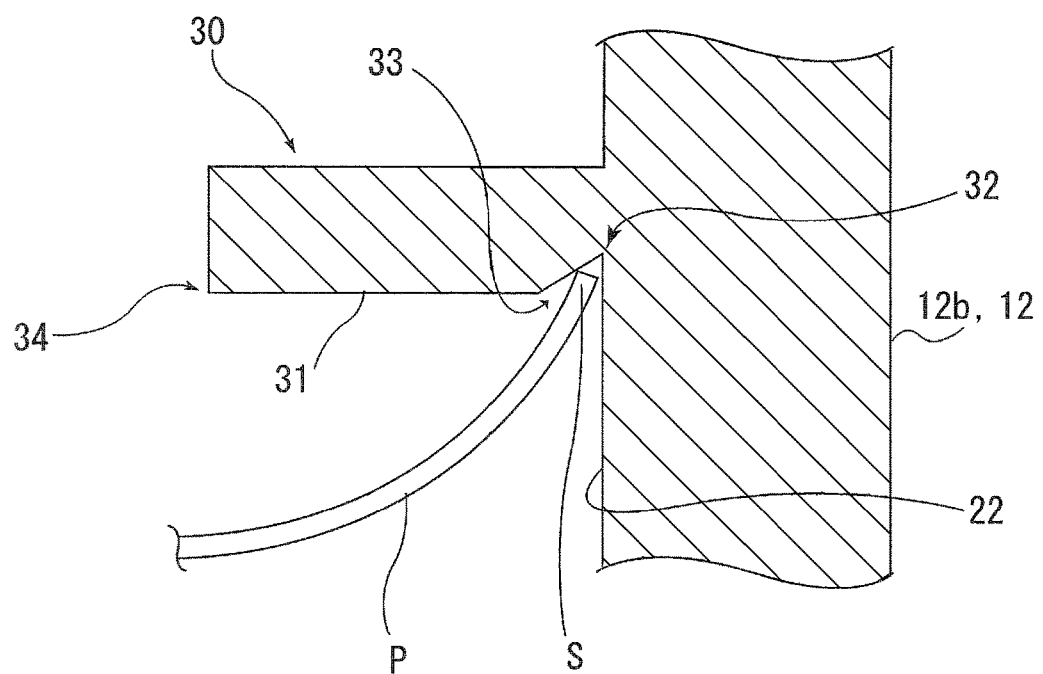
FIG. 7 is an enlarged view of a portion denoted as VII in FIG. 6.
Figure 8:
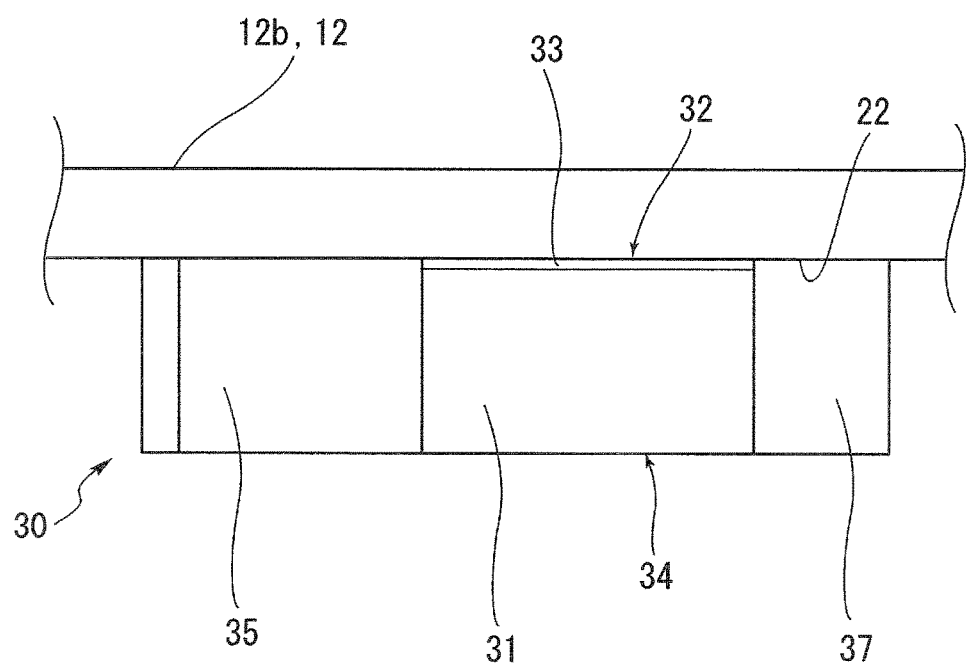
FIG. 8 is a schematic drawing of a volume limiter of the edge guide, viewed from below.
Figure 16:
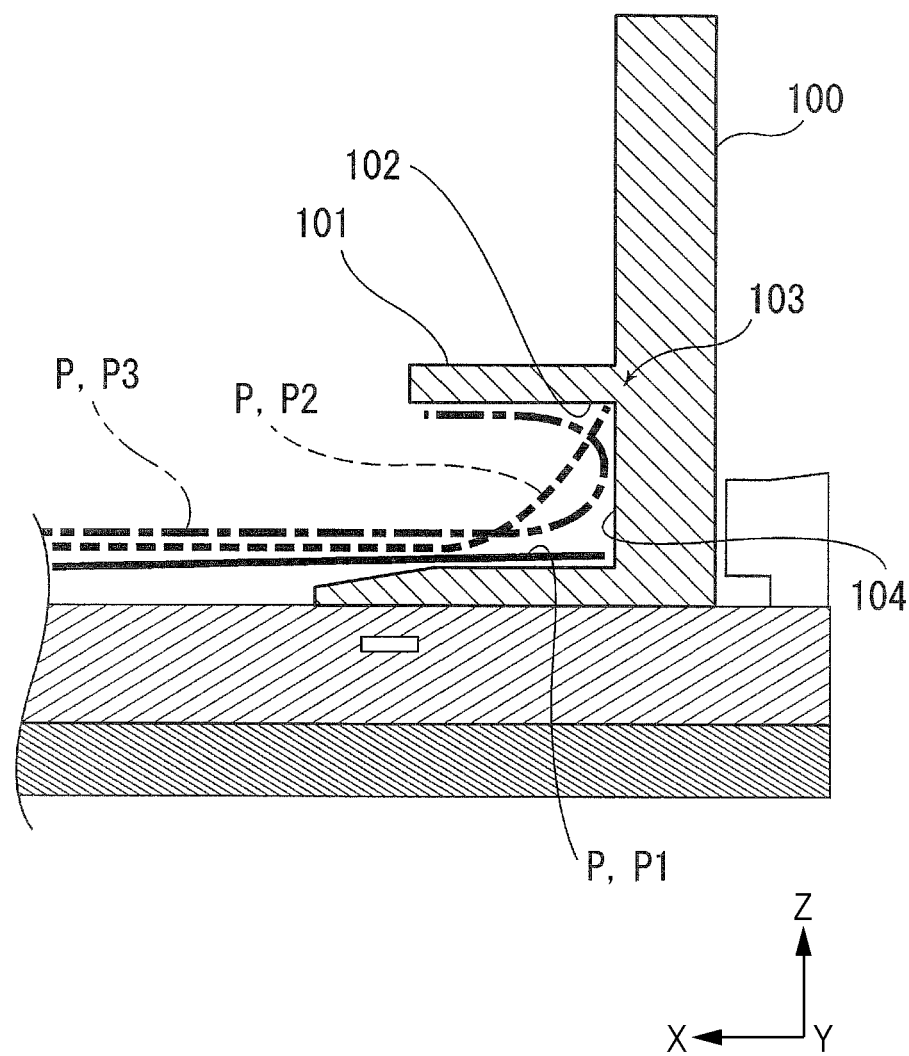
FIG. 16 is a cross-sectional view for explaining a conventional edge guide.

FIG. 1 is a perspective view showing an appearance of a scanner according to the invention. FIG. 2 is a perspective view showing the scanner according to the invention, with an upper cover unit opened and a discharge tray drawn out. FIG. 3 is a perspective view showing the scanner according to the invention, with the upper cover unit opened. FIG. 4 is a side cross-sectional view of the scanner shown in FIG. 2, for explaining a sheet transport route. FIG. 5 is a perspective view showing an edge guide. FIG. 6 is a cross-sectional view showing an essential part of a medium feeding apparatus according to the first embodiment. FIG. 7 is an enlarged view of a portion denoted as VII in FIG. 6. FIG. 8 is a schematic drawing of a volume limiter of the edge guide, viewed from below. FIG. 16 is a cross-sectional view for explaining a conventional edge guide.

In the X-Y-Z coordinate system indicated in each of the drawings, an X-direction corresponds to a width direction of the apparatus, in other words a sheet width direction, a Y-direction corresponds to a depth direction of the apparatus, and a Z-direction corresponds to a height direction of the apparatus.

Further, the side of the front face of the apparatus will be defined as +Y-side, and the side of the rear face of the apparatus will be defined as −Y-side. The left side of the apparatus viewed from the front will be defined as +X-side, and the right side will be defined as −X-side. The upper side of the apparatus will be defined as +Z-side, and a lower side (including a lower portion and a lower face) will be defined as −Z-side.

Although the sheet transport direction in the scanner 1 is inclined downward from an upper position on the rear side of the apparatus toward a lower portion on the front side, basically a sheet P is transported from the rear side to the front side of the apparatus. Therefore, the Y-axis direction will be referred to as the sheet transport direction. In the description given hereafter, the side to which the sheet P is transported (+Y-side) will be referred to as "downstream side", and the opposite side (−Y-side) will be referred to as "upstream side".

Outline of Scanner

Referring to FIG. 1 to FIG. 4, the outline of the scanner 1 will be described hereunder.

The scanner 1 (see FIG. 1 to FIG. 3) includes a main body 2 including a reading unit 20 (see FIG. 4) that reads an image on the sheet P, corresponding to the "medium", and a medium feeding apparatus 10 (see FIG. 4) that feeds the sheet P toward the reading unit 20. The scanner 1 also includes an upper cover unit 6 for opening and closing the main body 2.

The main body 2 includes a lower unit 3 and an upper unit 4. The upper unit 4 is mounted on the lower unit 3 so as to pivot about a pivotal fulcrum located on the downstream side in the sheet transport direction. When the upper unit 4 is opened to the front side of the apparatus from the lower unit 3, the sheet transport route of the sheet P is exposed. Accordingly, correction of a paper jam of the sheet P, and a maintenance work for a feed roller 16 and a transport roller pair 18 can be easily performed.

The upper cover unit 6 provided on the upper side of the main body 2 is mounted on the lower unit 3, so as to pivot with respect to an upper position of the rear side of the lower unit 3.

When the upper cover unit 6 is opened as shown in FIG. 2, a medium setting region 15 (see FIG. 2) located in an upper portion of the main body 2 is exposed. The medium setting region 15 serves as a sheet insertion port for setting the sheet P on the medium feeding apparatus 10 to be subsequently described.

The upper cover unit 6 provided on the upper side of the main body 2 also includes a first cover 7 and a second cover 8 for opening and closing the upper side of the upper unit 4 including the medium setting region 15. The first cover 7 and the second cover 8 are connected to each other via a pivotal shaft 11 (see FIG. 2 and FIG. 4). The first cover 7 is mounted on the lower unit 3 so as to pivot with respect to the upper position of the rear side of the lower unit 3.

The upper cover unit 6 can be set to a closed state to cover the upper side of the upper unit 4 as shown in FIG. 1, and an open state pivoted from the closed state shown in FIG. 1 toward the rear side of the apparatus as shown in FIG. 2, so as to open the medium setting region 15 to allow the sheet P to be set on the medium setting region 15. In the open state, the back surface of the upper cover unit 6 (respective back surfaces 7a and 8a of the first cover 7 and the second cover 8) serves as a mounting surface 9a for the sheet P, in a medium mounting section 9.

In the open state shown in FIG. 2, the upper cover unit 6 is opened such that the 7a of the first cover 7 and the back surface 8a of the second cover 8 become flush with each other, and in the closed state shown in FIG. 1 the second cover 8 is made to pivot about a pivotal shaft 11 so as to close, so that the upper cover unit 6 is closed along the shape of the upper side of the upper unit 4.

A numeral 13 in FIG. 2 denotes an auxiliary paper support 13 accommodated inside the second cover 8 so as to be drawn out therefrom.

The medium feeding apparatus 10 (see FIG. 4) is provided on the inner side of the medium setting region 15. The medium feeding apparatus 10 includes, as shown in FIG. 4, the medium mounting section 9 including the mounting surface 9a, located upstream of the feed roller 16 for feeding the sheet P and configured to mount a plurality of source documents (sheets P) to be transported toward the reading unit 20.

A pair of edge guides 12 (edge guides 12a and 12b shown in FIG. 2 and FIG. 3) are provided on the back surface 7a of the first cover 7, serving as the medium mounting section 9, to guide side edges in a width direction (X-axis direction) intersecting the feed direction, of the sheets P mounted on the mounting surface 9a of the medium mounting section 9.

The pair of edge guides 12 are slidable in the X-axis direction, according to different widths (lengths in the X-axis direction) of the sheet P. In FIG. 2, the edge guide 12a and the edge guide 12b are each located at an outer position in the width direction of the apparatus, so as to match a wider sheet, and located at an inner position in the width direction of the apparatus in FIG. 3, so as to match a narrower sheet.

Further details of the edge guide 12 will be subsequently described.

In addition, the lower unit 3 includes, on the front side of the apparatus, a discharge port 14, which is an opening through which the sheet P from inside of the main body 2, and a discharge tray 5 for receiving the sheet P discharged through the discharge port 14.

The discharge tray 5 can be retracted into the discharge port 14 as shown in FIG. 1, and drawn out from the discharge port 14 to the front side of the apparatus, as shown in FIG. 2. In this embodiment, the discharge tray 5 is composed of a plurality of tray elements 19a, 19b, 19c, and 19d (see FIG. 2) connected to each other, so as to adjust length to be drawn out from the discharge port 14, according to the size of the sheet P.

Here, the discharge tray 5 may be composed of a plurality of tray elements which are folded on each other when the discharge tray 5 is retracted, and unfolded when in use, instead of the draw-out type (also called insertion type or nest type) as in this embodiment.

Sheet Transport Route in Scanner

Referring now to FIG. 4, the sheet transport route in the scanner 1 will be described.

The sheet P set in the medium setting region 15 is mounted on the medium mounting section 9, in which the back surface (back surfaces 7a and 8b of the first cover 7 and the second cover 8) of the upper cover unit 6, pivoted to the rear side of the apparatus with respect to the lower unit 3, serves as the mounting surface 9a. The medium mounting section 9 is configured to mount a plurality of sheets P.

The sheet P mounted on the medium mounting section 9 is picked up by the feed roller 16 that rotates with respect to the lower unit 3, and fed to the downstream side (+Y-side). More specifically, the feed roller 16 rotates in contact with the back surface of the sheet P, in other words the surface of the sheet P opposing the mounting surface 9a, so as to feed the sheet P to the downstream side. Accordingly, when a plurality of sheets P are set on the medium mounting section 9 of the scanner 1, the sheets P are sequentially fed, from the lowermost one of the sheets P stacked on the mounting surface 9a. Here, the feed roller 16 is located such that a part thereof protrudes to the sheet transport route.

In addition, a separation roller 17 is provided in the upper unit 4 at a position opposing the feed roller 16. A predetermined rotational resistance is set to the separation roller 17, to prevent duplicate feeding of the sheets. When two or more sheets P are about to enter between the feed roller 16 and the separation roller 17, the upper one of the sheets is separated by the separation roller 17, so that only the sheet in contact with the feed roller 16 is nipped between the feed roller 16 and the separation roller 17, thus to be fed to the downstream side in the feed direction.

The transport roller pair 18, the reading unit 20, and a discharge roller pair 21 are provided on the downstream side of the feed roller 16 in the transport direction.

In this embodiment, the discharge roller pair 21 includes a discharge drive roller 21a provided in the lower unit 3, and a discharge slave roller 21b provided in the upper unit 4 so as to follow up the rotation of the discharge drive roller 21a.

The sheet P nipped between the feed roller 16 and the separation roller 17 and fed to the downstream side in the transport direction is nipped between the transport roller pair 18 and transported to the reading unit 20 located downstream of the transport roller pair 18.

The transport roller pair 18 includes a transport drive roller 18a provided in the lower unit 3, and a transport drive roller 18b provided in the upper unit 4 so as to follow up the rotation of the transport drive roller 18a.

In this embodiment, the feed roller 16, the transport drive roller 18a, and the discharge drive roller 21a are driven to rotate by a non-illustrated drive source provided in the lower unit 3.

Further, the feed roller 16, the separation roller 17, and the transport roller pair 18 are located in the central position in the width direction (X-axis direction) intersecting the medium transport direction, to perform what is known as center feed, for which the sheet P is positioned with reference to the center of the sheet P in the width direction. Therefore, the discharge roller pair 21 is also located in the central position in the X-axis direction.

The reading unit 20 includes an upper reading sensor 20a located on the side of the upper unit 4, and a lower reading sensor 20b located on the side of the lower unit 3. In this embodiment, the upper reading sensor 20a and the lower reading sensor 20b are each constituted of, for example, a contact image sensor module (CISM).

After the image on at least one of the front surface and the back surface of the sheet P is read by the reading unit 20, the sheet P is nipped between the discharge roller pair 21 located downstream of the reading unit 20 and discharged to the discharge tray 5 through the discharge port 14. Here, a dot line in FIG. 4 indicates the sheet transport route in the scanner 1, along which the sheet P is transported.

Configuration of Edge Guide in Medium Feeding Apparatus

Referring now FIG. 5 to FIG. 8, the edge guide 12 provided in the medium mounting section 9 of the medium feeding apparatus 10 will be described in detail. The edge guide 12a and the edge guide 12b located in the medium mounting section 9 so as to oppose each other in the width direction of the apparatus are formed in symmetrical shapes with respect to a Y-Z plane. FIG. 5 to FIG. 8 illustrate the edge guide 12b on the right in a view from the front side of the apparatus, and the following description refers to the edge guide 12b. The description of the edge guide 12a, which is symmetrical to the edge guide 12b, will be omitted.

The edge guide 12b (see FIG. 6) includes a volume limiter 30 (see also FIG. 5) formed on a guide surface 22 that guides the side edge, in the width direction (X-axis direction), of the sheet P mounted on the medium mounting section 9. The volume limiter 30 includes a limiting surface 31 that limits the number of sheets P mounted on the medium mounting section 9. The volume limiter 30 is formed, as illustrated in the cited drawings, with a spacing from the mounting surface 9a of the medium mounting section 9 in the height direction, and extends from the guide surface 22 in the +X-direction, so as to intersect the guide surface 22.

The volume limiter 30 serves to prevent a larger number of sheets P than a predetermined upper limit from being mounted on the mounting surface 9a.

The volume limiter 30 (see FIG. 5) includes a conducting portion 37 formed upstream (−Y-side) of the limiting surface 31 with a downward inclination toward the limiting surface 31, to facilitate the sheet P to be conducted to the region between the limiting surface 31 and the mounting surface 9a. The volume limiter 30 also includes a relief portion 35 formed downstream (+Y-side) of the limiting surface 31, with an upward inclination toward the downstream side from the limiting surface 31, so as to prevent the trailing edge of the sheet P being fed from hitting the volume limiter 30.

Further, a numeral 36 denotes a scooping portion of the volume limiter 30, formed so as to scoop up a side edge S of the sheet P, when the edge guide 12b is moved in the X-axis direction according to the width of the sheet P mounted on the medium mounting section 9.

The limiting surface 31 includes a groove 33 (see FIG. 6 and FIG. 8) formed at a position between a corner portion 32, formed at the intersection of an end portion (−X-side in FIG. 6) of the limiting surface 31 in the width direction (X-axis direction) and the guide surface 22, and the other end portion of the limiting surface 31 (end portion 34 on the +X-side in FIG. 6), so as to extend in the feed direction (+Y-axis direction). As will be subsequently described in detail, the groove 33 serves to restrict the side edge S of the sheet P from moving in the width direction, by receiving at least a part of the side edge S.

In this embodiment, the groove 33 is formed in the corner portion 32.

Now, the sheet P fed by the feed roller 16 may skew, in other words may be obliquely inclined while being transported. In a conventional edge guide 100 shown in FIG. 16, in which the groove 33 (FIG. 6) is not provided in a limiting surface 102 of a volume limiter 101, when the sheet P (solid line P1 in FIG. 16) located in a proper position skews so as to move in the −X-direction, the side edge of the sheet P may climb up along a guide surface 104 (dot line P2 in FIG. 16), and may further proceed beyond a corner portion 103 and be curled in the +X-direction along the limiting surface 102 of the volume limiter 101 (dash-dot line P3 in FIG. 16).

In particular, when the sheet P is thin and lacks in rigidity, the sheet edge is exempted from being restricted by the guide surface 104 owing to the lack of rigidity, despite being abutted against the guide surface 104 at an initial stage of the skew. As result, the sheet edge climbs up along the guide surface 104, and the guide surface 104 fails to prevent the skew.

In the case where the edge guide 12b includes the groove 33 formed in the limiting surface 31 as in this embodiment, the side edge S of the sheet P enters the groove 33 as shown in FIG. 7, when the sheet P is about to skew such that the side edge S moves in the −X-direction, and is restricted from moving further in the −X-direction. Therefore, the skew of the sheet P can be prevented.

Since the edge guide 12a is configured in the same way (includes the groove 33 in the limiting surface 31) in this embodiment, the edge guide 12a prevents the sheet P from skewing such that the side edge S on the +X-side moves in the +X-direction.

Although it is preferable to form the groove 33 in both of the edge guide 12a and the edge guide 12b, the groove 33 may be formed only in either of the edge guides.

Since the groove 33 is formed in the limiting surface 31, even when a plurality of sheets P are stacked in a bundle on the medium mounting section 9, the groove 33 is less likely to impose a resistance against the side edges of the stacked sheets P, compared with the case where the grooves are formed on the guide surface 22 as in the conventional apparatus (e.g., JP-A-2002-284362). Such a configuration further assures the proper feeding of the sheets P mounted on the medium mounting section 9.

In addition, since the groove 33 is formed in the corner portion 32 of the limiting surface 31 in this embodiment, the side edge S reaches the groove 33 immediately after the sheet P starts to move obliquely. Therefore, the skew of the sheet can be effectively prevented.

The position where the groove 33 may be formed is not limited to the corner portion 32 of the limiting surface 31. It suffices that the groove 33 is formed at least at a position between the corner portion 32 of the limiting surface 31 and the end portion 34 thereof in the +X-direction.

Referring to FIG. 7, the groove 33 according to this embodiment is formed so as to have a cutaway-shaped cross-section when taken in the width direction of the volume limiter 30 (taken along the Z-X plane). Such a configuration facilitates the side edge S of the sheet P to be guided by the sloped surface of the cutaway shape, thus to be introduced in the groove 33.

The groove 33 may be formed, for example, in a rectangular recessed shape (ref. second embodiment described hereunder) instead of the cutaway shape. The shape of the groove 33 is not specifically limited, provided that the groove 33 is formed as a concave portion that can receive the side edge S of the sheet P.

Second Embodiment

Figure 9:
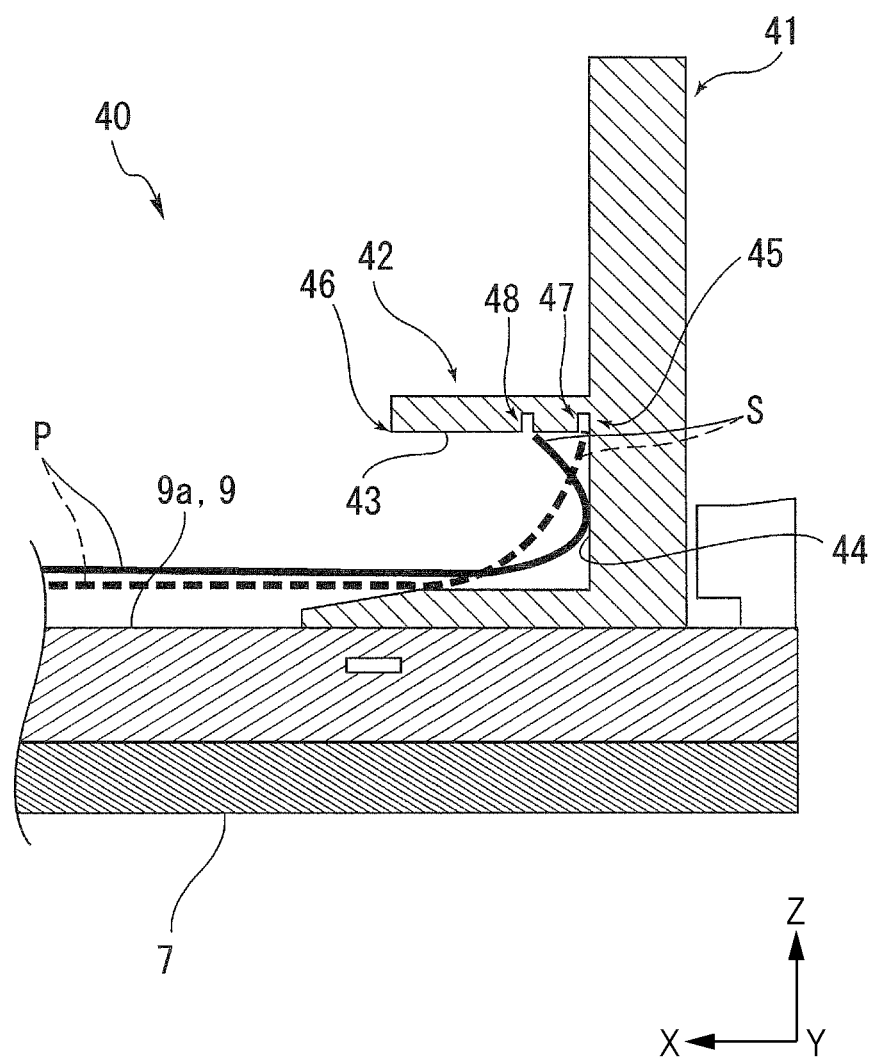
FIG. 9 is a cross-sectional view showing an essential part of a medium feeding apparatus according to a second embodiment.

A second embodiment refers to a different configuration of the edge guide of the medium feeding apparatus, as shown in FIG. 9. FIG. 9 is a cross-sectional view showing an essential part of a medium feeding apparatus according to the second embodiment.

In the description of the subsequent embodiments, including t this embodiment, the same elements as those of the first embodiment will be given the same numeral, and the description thereof will not be repeated. The details of the edge guide will be described with reference to the edge guide on the right, in other words on the −X-side, out of the pair of edge guides.

A medium feeding apparatus 40 according to the second embodiment includes a first groove 47, in other words the groove that restricts the side edge S of the sheet P from moving in the width direction by receiving at least a part of the side edge S. The first groove 47 is formed in a corner portion 45, formed on a limiting surface 43 of a volume limiter 42 provided on a guide surface 44 of an edge guide 41, at the intersection with the guide surface 44.

In addition, a second groove 48 is formed in the limiting surface 43, at a position spaced from the first groove 47 toward an end portion 46 on the +X-side of the limiting surface 43.

In this embodiment, the first groove 47 and the second groove 48 are formed so as to have a cross-section of a rectangular recessed shape, with an opening oriented downward, when taken in the width direction (X-axis direction) of the volume limiter 42 (along the Z-X plane).

In this embodiment also, the side edge S of the sheet P, indicated by a dot line in FIG. 9, enters the first groove 47 formed in the corner portion 45, and therefore the skew of the sheet P can be prevented.

Further, the second groove 48 is provided on the side of the end portion 46 on the +X-side, with respect to the first groove 47. Accordingly, even when the side edge S of the sheet P proceeds toward the end portion 46 beyond the first groove 47 formed in the corner portion 45, as indicated by a solid line in FIG. 9, the second groove 48 restricts the side edge S of the sheet P from proceeding further. The mentioned configuration further assures the prevention of the skew of the sheet P.

Third Embodiment

Figure 10:
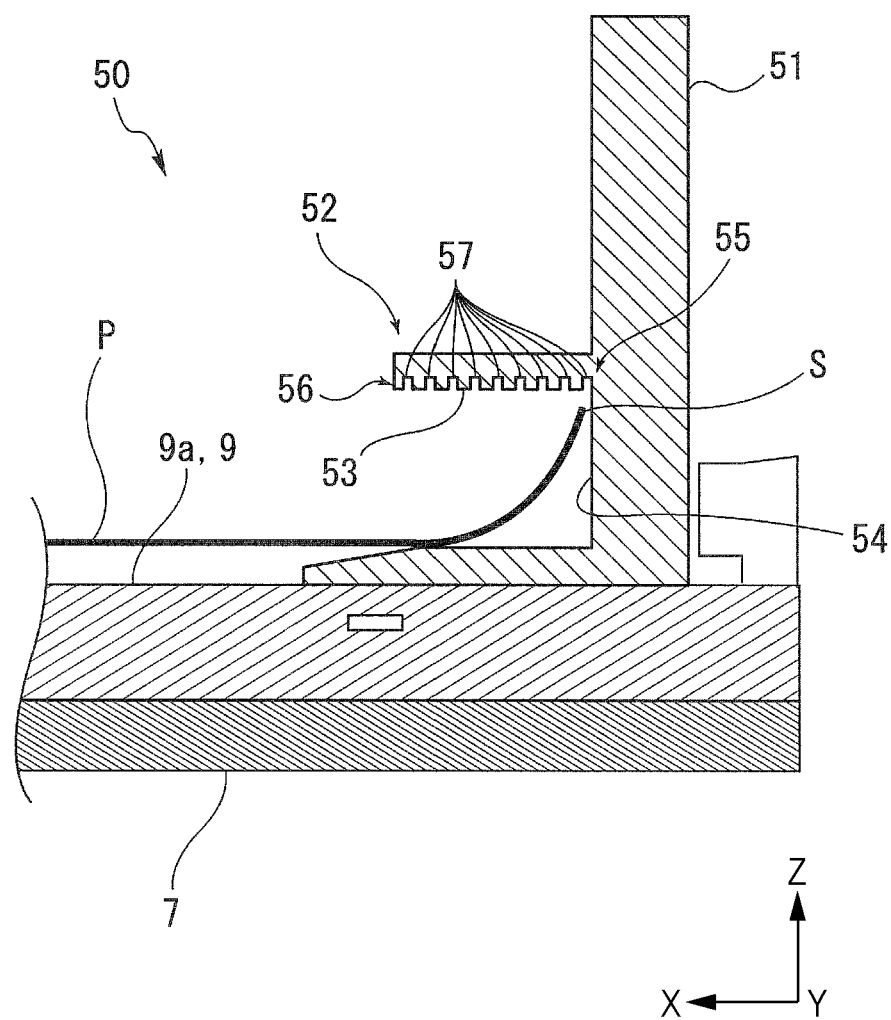
FIG. 10 is a cross-sectional view showing an essential part of a medium feeding apparatus according to a third embodiment.

A third embodiment refers to another different configuration of the edge guide of the medium feeding apparatus, as shown in FIG. 10. FIG. 10 is a cross-sectional view showing an essential part of a medium feeding apparatus according to a third embodiment.

A medium feeding apparatus 50 according to the third embodiment 3 includes a plurality of grooves 57 formed in a limiting surface 53 of a volume limiter 52 provided on a guide surface 54 of an edge guide 51. As shown in FIG. 10, the plurality of grooves 57 are formed so as to have a cross-section of a comb-teeth shape, when taken in the width direction (X-axis direction) of the volume limiter 42 (along the Z-X plane).

The plurality of grooves 57 are aligned such that, in a plan view of the portion shown in FIG. 10, the groove 57 at the right end, in other words at the end in the −X-direction is located at a corner portion 55, and the remaining grooves 57 are formed generally at regular intervals, as far as an end portion 56 in the +X-direction.

Since the limiting surface 53 of the volume limiter 52 includes the plurality of grooves 57 formed in the comb-teeth shape, the side edge S of the sheet P more securely enters one of the grooves 57, and therefore the skew of the sheet P can be more surely prevented.

Although the plurality of grooves 57 are each formed in the rectangular recessed shape with the opening oriented downward, like those of the second embodiment, the grooves 57 may be formed in a cutaway shape like those of the first embodiment.

Fourth Embodiment

Figure 11:
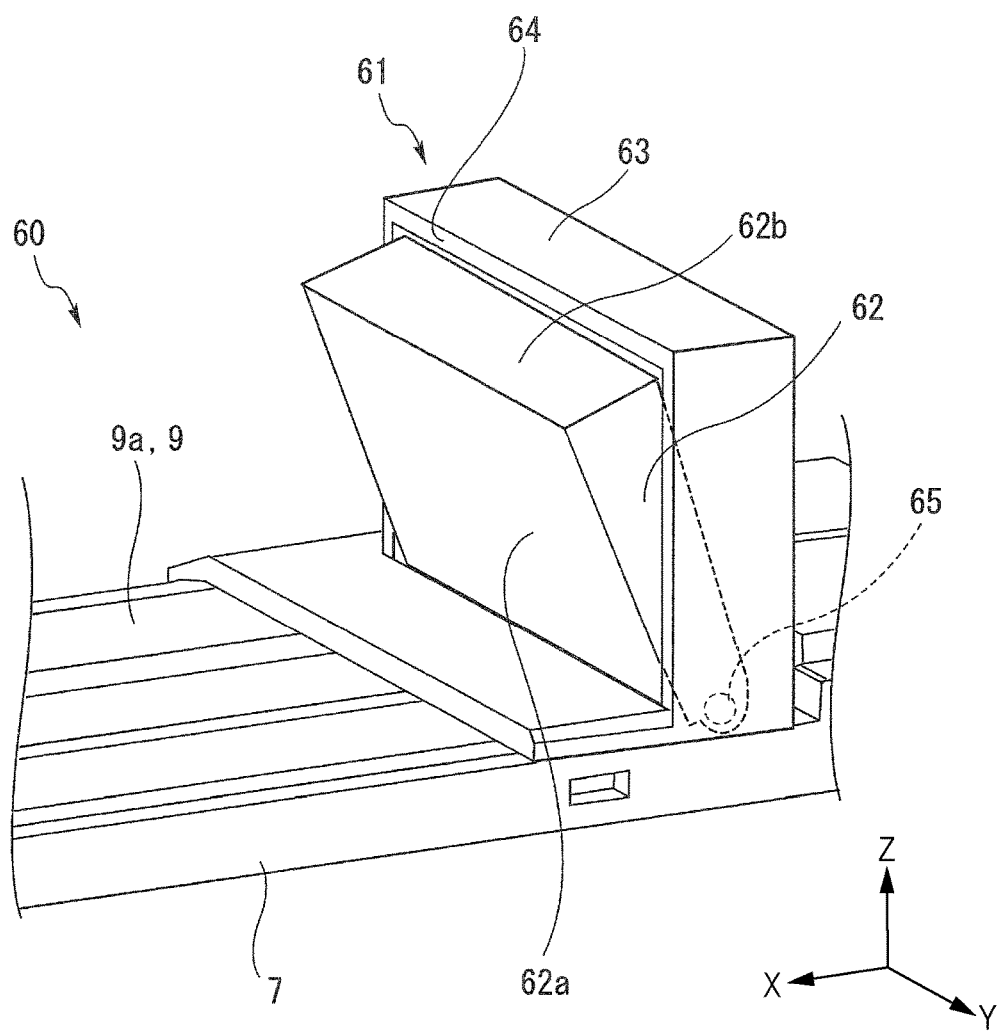
FIG. 11 is a perspective view showing an essential part of a medium feeding apparatus according to a fourth embodiment.
Figure 12:
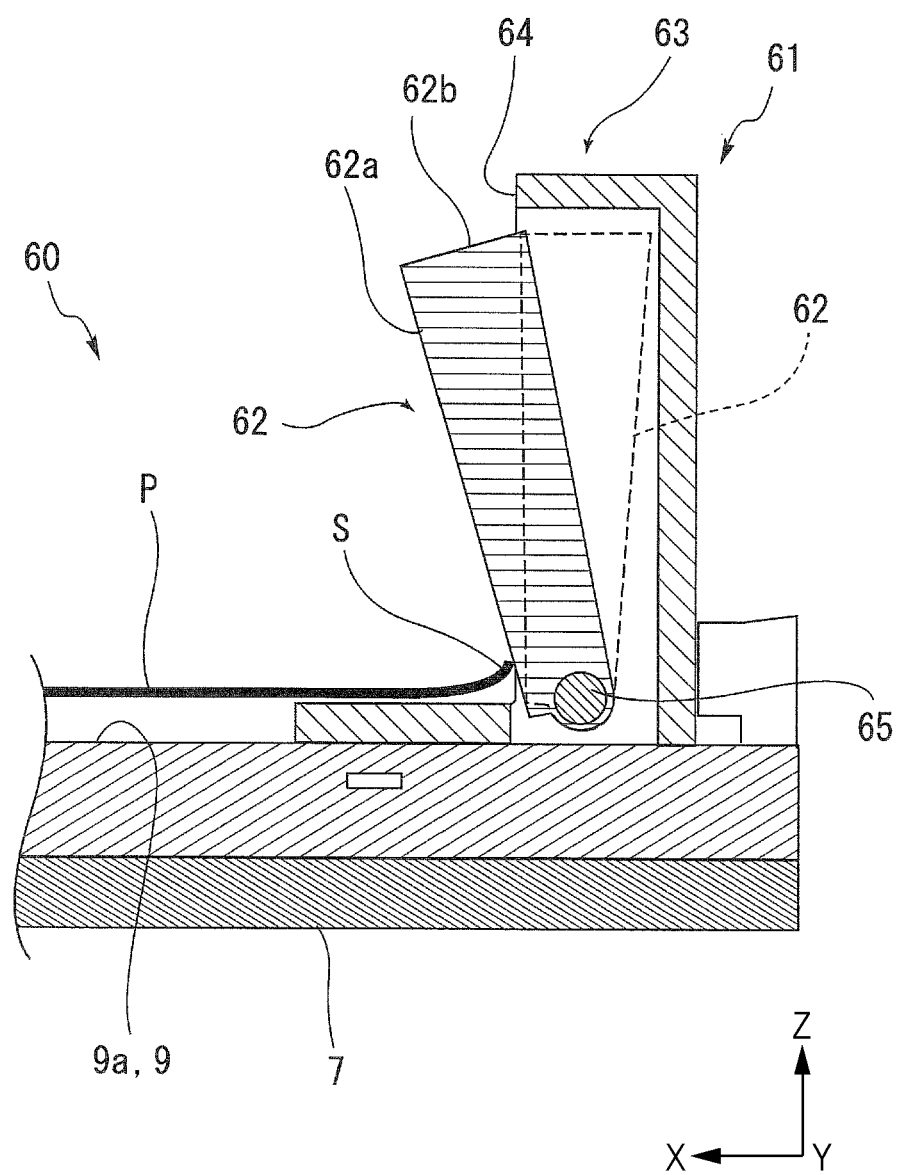
FIG. 12 is a cross-sectional view taken along a Z-X plane in FIG. 11.
Figure 13:
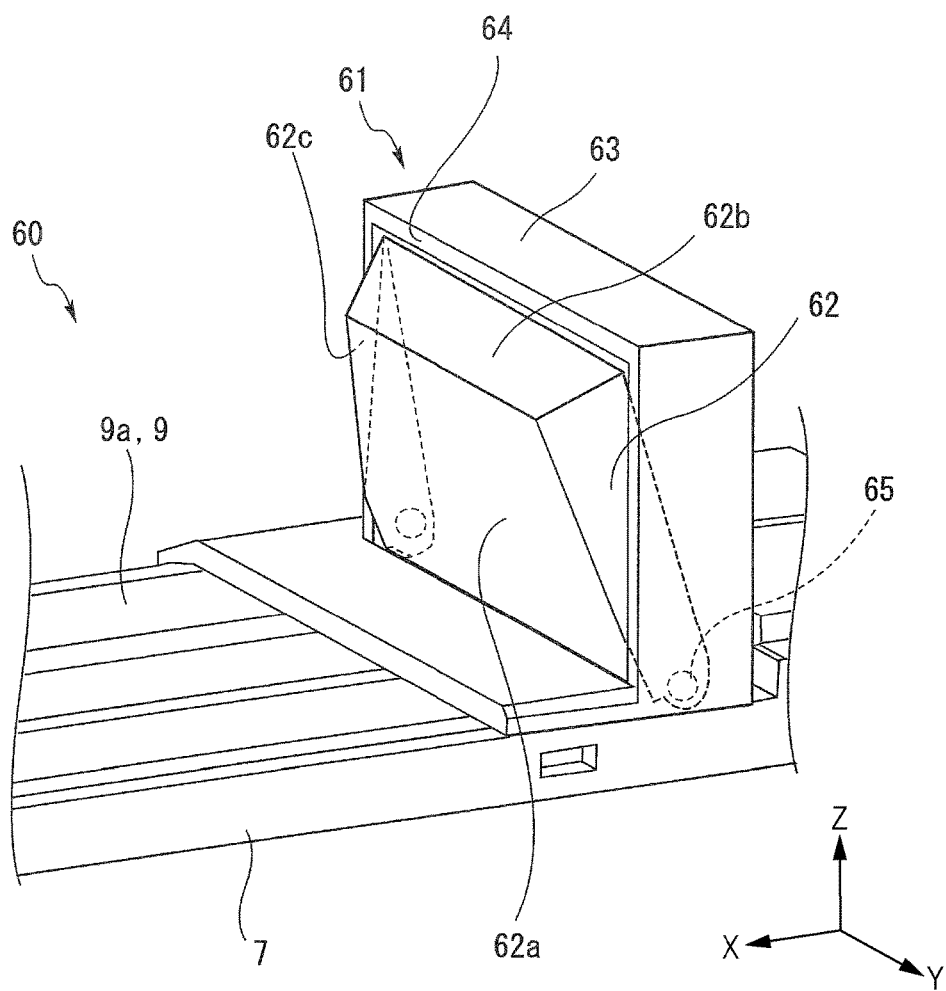
FIG. 13 is a perspective view showing a variation of a movable portion, including a sloped surface formed on an upstream side.

A fourth embodiment refers to still another different configuration of the edge guide of the medium feeding apparatus, as shown in FIG. 11 to FIG. 13. FIG. 11 is a perspective view showing an essential part of a medium feeding apparatus according to the fourth embodiment. FIG. 12 is a cross-sectional view taken along a Z-X plane in FIG.

11. FIG. 13 is a perspective view showing a variation of a movable portion, including a sloped surface formed on the upstream side.

In a medium feeding apparatus 60 according to the fourth embodiment, an edge guide 61 includes a main portion 63 constituting the general appearance of the edge guide 61 and including a guide surface 64, and a movable portion 62 including a first surface 62a configured to pivot so as to protrude from the guide surface 64 of the main portion 63 (edge guide 61). The movable portion 62 has a pivotal fulcrum 65 at a position close to the medium mounting section 9 as shown in FIG. 11 and FIG. 12, so that a free end 62b pivots, owing to the self-weight of the movable portion 62, so as to protrude from the guide surface 64.

When a large number of sheets P are mounted on the medium mounting section 9, for example in a bundle, the movable portion 62 is accommodated inside the main portion 63 such that the first surface 62a becomes generally flush with the guide surface 64, and the movable portion 62 is restricted by the sheet bundle from pivoting in the protruding direction.

Then with a decrease in number of stacked sheets restricting the pivotal movement of the movable portion 62, the movable portion 62 pivots, owing to the self-weight, in the protruding direction. In other words, the first surface 62a protrudes from the guide surface 64 by a larger amount, with the decrease in number of sheets P mounted on the medium mounting section 9.

When the movable portion 62 pivots such that the first surface 62a protrudes from the guide surface 64 of the edge guide 61, as indicated by a solid line in FIG. 12, the first surface 62a defines an acute angle with respect to the mounting surface 9a of the medium mounting section 9. Accordingly, the side edge S of the sheet P is impeded from climbing up along the first surface 62a, and resultantly restricted from moving in the −X-direction.

Here, in general, the skew of the sheet P being fed is more likely to take place when a fewer number of sheets P are mounted on the medium mounting section 9.

Since the movable portion 62 pivots when the number of sheets P mounted on the medium mounting section 9 decreases, so that the first surface 62a protrudes by a larger amount from the guide surface 64 of the edge guide 61, the skew of the medium can be effectively prevented, even when a small number of sheets P are mounted.

In contrast, when a large number of sheets P are mounted on the medium mounting section 9, the movable portion 62 is not or barely protruding from the guide surface 64, and therefore the movable portion 62 barely imposes a resistance against the sheets P.

Consequently, the sheets P mounted on the medium mounting section 9 can be properly fed.

Here, it is preferable to form a sloped surface 62c on the movable portion 62, on the upstream side in the feed direction of the sheet P as shown in FIG. 13, so as to conduct the sheet P to the first surface 62a.

For example, when none or only a few number of sheets P are mounted on the medium mounting section 9, the movable portion 62 is protruding. Accordingly, the movable portion 62 is often protruding when a user attempts to replenish the sheets P on the medium mounting section 9.

However, the presence of the sloped surface 62c formed on the movable portion 62 facilitates the sheets P to be smoothly inserted along the first surface 62a of the movable portion 62, when the user inserts the sheet bundle in the feed direction of the sheet P. Therefore, the sheets P can be easily replenished on the medium mounting section 9.

Fifth Embodiment

Figure 14:
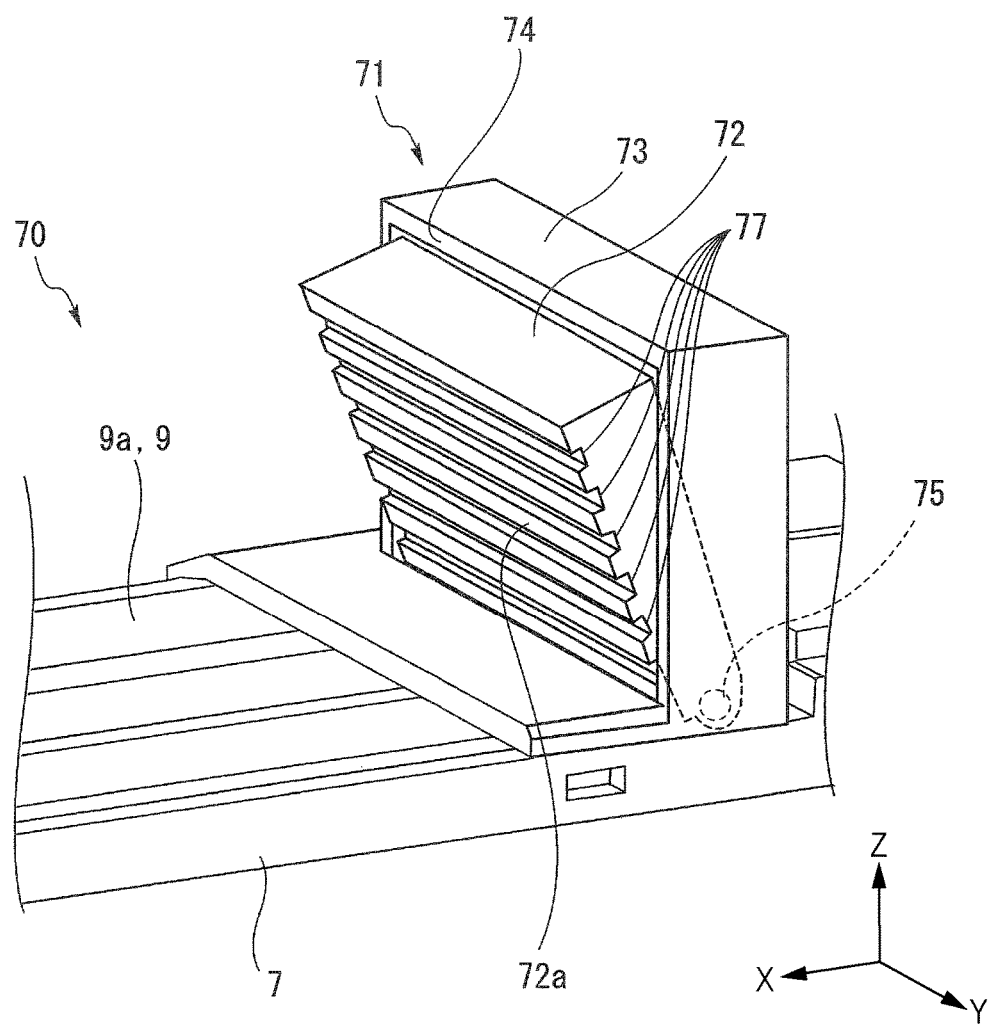
FIG. 14 is a perspective view showing an essential part of a medium feeding apparatus according to a fifth embodiment.
Figure 15:
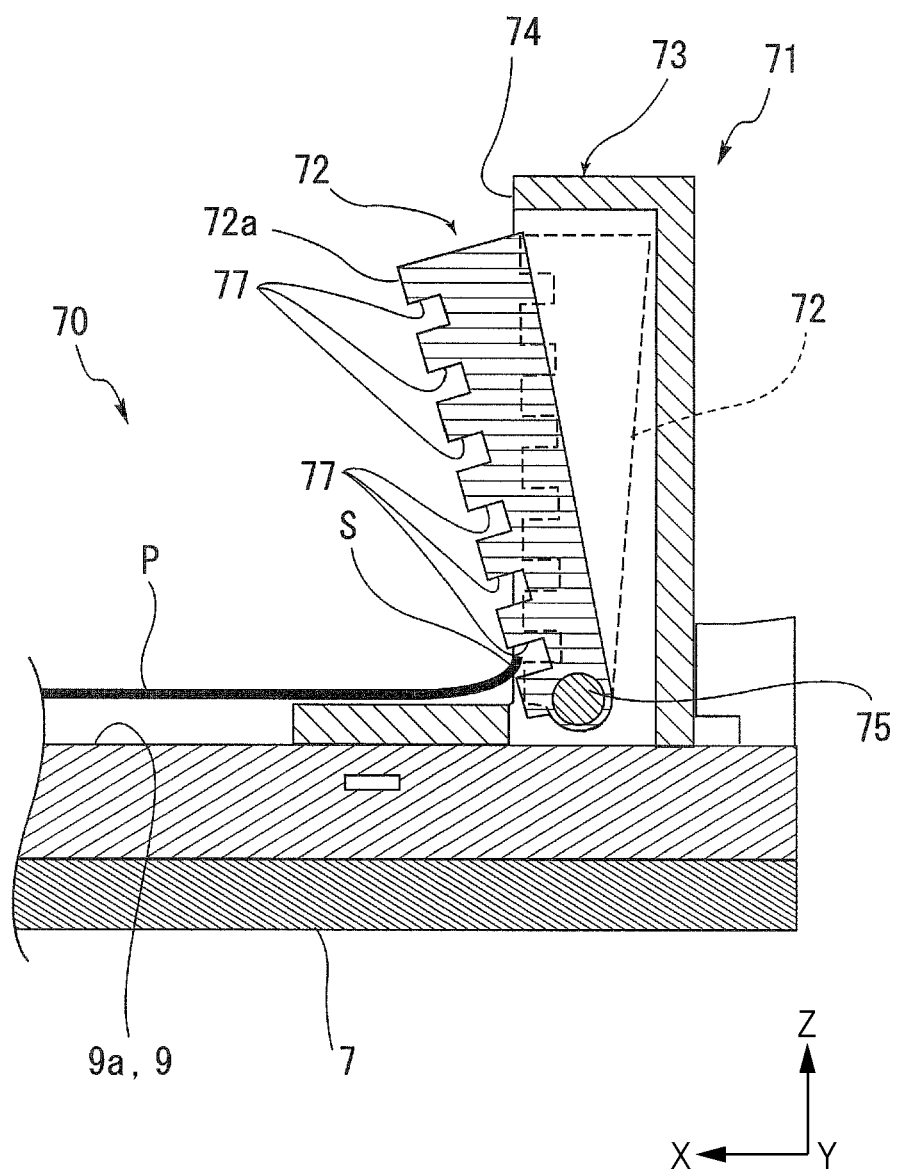
FIG. 15 is a cross-sectional view taken along a Z-X plane in FIG. 14.

A fifth embodiment refers to still another different configuration of the edge guide of the medium feeding apparatus, as shown in FIG. 14 and FIG. 15. FIG. 14 is a perspective view showing an essential part of a medium feeding apparatus according to the fifth embodiment. FIG. 15 is a cross-sectional view taken along a Z-X plane in FIG. 14.

In a medium feeding apparatus 70 according to the fifth embodiment, an edge guide 71 includes, as in the fourth embodiment, a main portion 73 including a guide surface 74, and a first surface 72a. The first surface 72a includes a movable portion 72 configured to pivot so as to protrude from the guide surface 74. In FIG. 14 and FIG. 15, a numeral 75 denotes the pivotal fulcrum of the movable portion 72.

The movable portion 72 according to this embodiment includes, as a distinctive feature, a plurality of grooves 77 formed in at least a part of the first surface 72a so as to extend in the feed direction of the sheet P (+Y-direction) as show in FIG. 14, and configured to insert at least a part of the side edge S of the sheet P to thereby restrict the side edge S from moving in the width direction.

In this embodiment, the plurality of grooves 77 are formed in the first surface 72a, such that the cross-section of the movable portion 72 along the Z-X plane assumes a comb-teeth shape as shown in FIG. 15.

The presence of the grooves 77 in the first surface 72a impedes the side edge S of the sheet P from climbing up along the first surface 72a, to thereby further assure the prevention of the skew of the sheet P.

Sixth Embodiment

Figure 17:
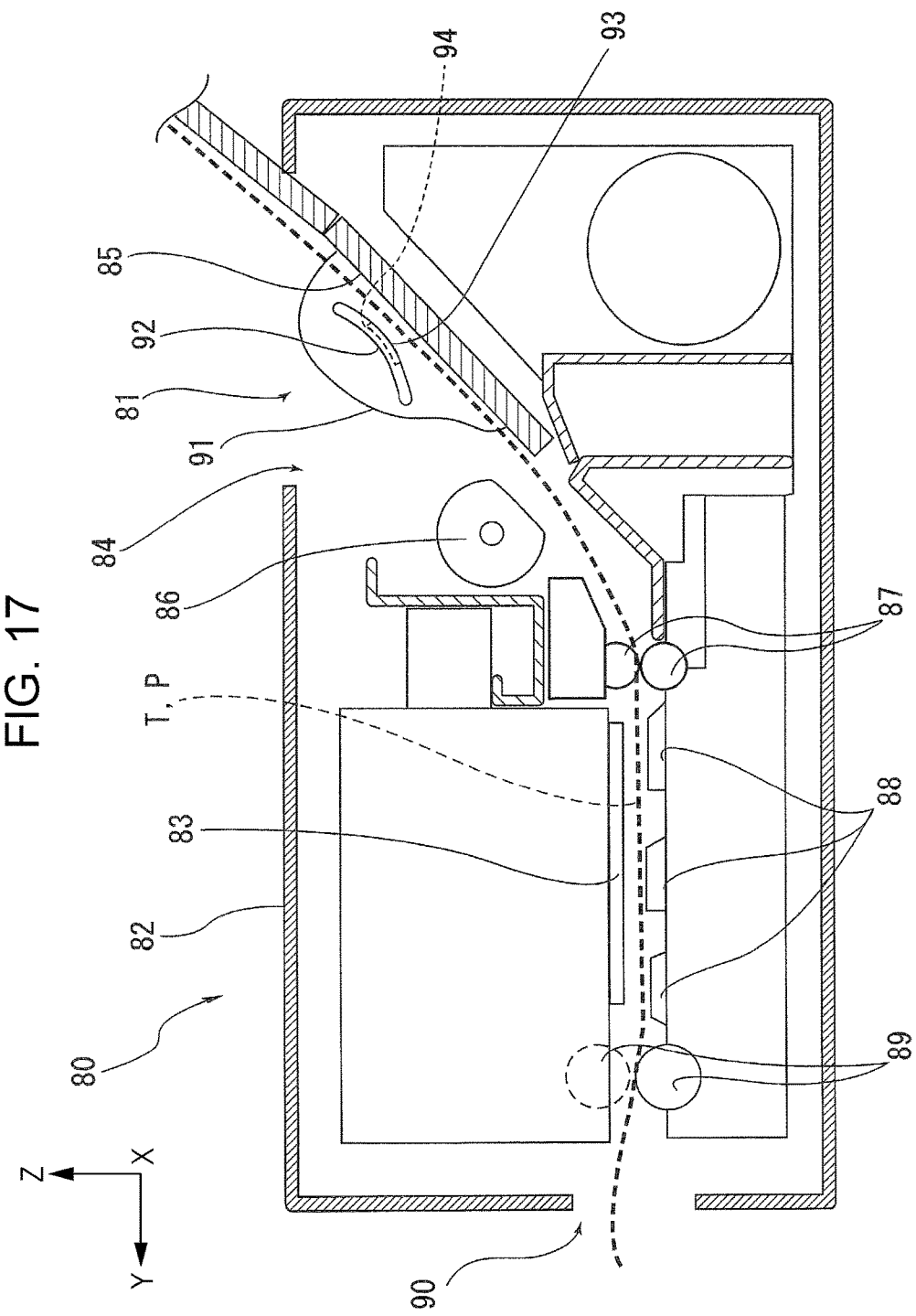
FIG. 17 is a side cross-sectional view of a printer according to the invention.

Referring to FIG. 17, a sixth embodiment 6 will be described. FIG. 17 is a side cross-sectional view of a printer according to the invention.

An ink jet printer 80 (hereinafter, simply printer 80), exemplifying the "recording apparatus" in the invention, includes a recording head 83 exemplifying the "recording unit" that performs recording on the sheet P exemplifying the medium, the printer 80 being provided inside a main body 82. The medium feeding apparatus according to the first to the fifth embodiments may be employed as a medium feeding apparatus 81 that feeds the sheet P toward the recording head 83.

Hereunder, an outline of the printer 80 will be described.

The printer 80 is configured so as to allow the sheet P to be set on a medium mounting section 85 of the medium feeding apparatus 81, from a medium setting region 84 of the main body 82. A dot line denoted by a code T in FIG. 17 indicates the transport route of the sheet P.

The sheet P set on the medium mounting section 85 is fed by a feed roller 86, and transported by a transport roller pair 87 located downstream of the feed roller 86, to a position under the recording head 83. A numeral 88 denotes a medium platen that supports the sheet P at the position opposing the recording head 83.

After the recording head 83 performs the recording in a recording region, the sheet P is transported by a discharge roller pair 89 located downstream of the recording head 83, to be discharged through a discharge port 90, which is an opening provided in the main body 82.

The medium feeding apparatus 81 shown in FIG. 17 is similarly configured to the medium feeding apparatus 10 according to the first embodiment. More specifically, the medium feeding apparatus 81 includes a pair of edge guides 91 (FIG. 17 illustrates only one of the edge guides) provided on the respective sides of the medium mounting section 85 in the width direction (X-axis direction), a volume limiter 92 provided on the edge guide 91 so as to limit the number of sheets P to be mounted on the medium mounting section 85. The edge guide 91 includes a groove 94 formed in a corner portion (without a numeral in FIG. 17) of a limiting surface 93, so as to insert the side edge of the sheet P.

The printer 80 prevents, with the medium feeding apparatus 81 incorporated therein, the skew of the sheet P transported through the printer 80, and thus properly transports the sheet P.

It is a matter of course that the present invention is not limited to the foregoing embodiment, but may be modified in various manners within the scope defined by the appended claims, and that such modifications are included in the present invention.

The entire disclosure of Japanese Patent Application No.2016-247512, filed Dec. 21, 2016, is expressly incorporated by reference herein.

What is claimed is:

1. A medium feeding apparatus comprising:
a medium mounting section including a mounting surface configured to mount a plurality of sheets of media to be fed;
a pair of edge guides provided on the medium mounting section and each including a guide surface that guides a side edge of the medium in a width direction intersecting a feed direction; and
a volume limiter located with a spacing from the mounting surface and extending from the guide surface of at least one of the pair of edge guides in a direction intersecting the guide surface, the volume limiter including a limiting surface that limits a number of sheets of the medium mounted on the medium mounting section,
wherein the limiting surface includes a groove formed so as to extend in the feed direction, at a position between a corner portion formed at an intersection of an end portion of the limiting surface in the width direction and the guide surface, and the other end portion of the limiting surface, the groove being configured to restrict the side edge from moving in the width direction.

2. The medium feeding apparatus according to claim 1, wherein the groove is formed at least in the corner portion.

3. The medium feeding apparatus according to claim 2, wherein the limiting surface includes:
a first groove corresponding to the groove formed at the corner portion; and
a second groove formed at a position spaced from the first groove in a direction toward the other end portion.

4. An image reading apparatus comprising:
a reading unit that reads an image on a medium; and
the medium feeding apparatus according to claim 3, configured to feed the medium to the reading unit.

5. A recording apparatus comprising:
a recording unit that performs recording on a medium; and
the medium feeding apparatus according to claim 3, configured to feed the medium to the recording unit.

6. An image reading apparatus comprising:
a reading unit that reads an image on a medium; and
the medium feeding apparatus according to claim 2, configured to feed the medium to the reading unit.

7. A recording apparatus comprising:
a recording unit that performs recording on a medium; and
the medium feeding apparatus according to claim 2, configured to feed the medium to the recording unit.

8. The medium feeding apparatus according to claim 1, wherein the volume limiter includes a plurality of the grooves, such that a cross-section of the volume limiter in the width direction assumes a comb-teeth shape.

9. An image reading apparatus comprising:
a reading unit that reads an image on a medium; and
the medium feeding apparatus according to claim 8, configured to feed the medium to the reading unit.

10. A recording apparatus comprising:
a recording unit that performs recording on a medium; and
the medium feeding apparatus according to claim 8, configured to feed the medium to the reading unit.

11. An image reading apparatus comprising:
a reading unit that reads an image on a medium; and
the medium feeding apparatus according to claim 1, configured to feed the medium to the recording unit.

12. A recording apparatus comprising:
a recording unit that performs recording on a medium; and
the medium feeding apparatus according to claim 1, configured to feed the medium to the recording unit.

13. A medium feeding apparatus comprising:
a medium mounting section including a mounting surface configured to mount a plurality of sheets of media to be fed;
a pair of edge guides provided on the medium mounting section and each including a guide surface that guides a side edge of the medium in a width direction intersecting a feed direction; and
a movable portion provided on at least one of the pair of edge guides and formed so as to pivot such that a first surface of the movable portion protrudes from the guide surface,
wherein the movable portion has a pivotal fulcrum on a side closer to the medium mounting section, so that a free end of the movable portion pivots, owing to a self-weight thereof, in a direction in which the movable portion protrudes from the guide surface.

14. The medium feeding apparatus according to claim 13, wherein the first surface of the movable portion protrudes from the guide surface by a larger amount, with a decrease in number of sheets of the media.

15. An image reading apparatus comprising:
a reading unit that reads an image on a medium; and
the medium feeding apparatus according to claim 14, configured to feed the medium to the reading unit.

16. The medium feeding apparatus according to claim 13, wherein the movable portion includes a conducting portion formed on an upstream side in the feed direction of the medium, to conduct the medium toward the first surface.

17. An image reading apparatus comprising:
a reading unit that reads an image on a medium; and
the medium feeding apparatus according to claim 16, configured to feed the medium to the reading unit.

18. The medium feeding apparatus according to claim 13, wherein the movable portion includes a groove formed at least in a part of the first surface, so as to extend in the feed direction, to insert at least a part of the side edge of the medium to thereby restrict the side edge from moving in the width direction.

19. An image reading apparatus comprising:
a reading unit that reads an image on a medium; and
the medium feeding apparatus according to claim 18, configured to feed the medium to the reading unit.

20. An image reading apparatus comprising:
a reading unit that reads an image on a medium; and
the medium feeding apparatus according to claim 13, configured to feed the medium to the reading unit.

\* \* \* \* \*